United States Patent [19]

Sturges et al.

[11] Patent Number: 5,742,793

[45] Date of Patent: Apr. 21, 1998

[54] METHOD AND APPARATUS FOR DYNAMIC MEMORY MANAGEMENT BY ASSOCIATION OF FREE MEMORY BLOCKS USING A BINARY TREE ORGANIZED IN AN ADDRESS AND SIZE DEPENDENT MANNER

[75] Inventors: Jay Sturges, Orangevale; Greg Hibdon, Folsom, both of Calif.

[73] Assignee: Intel Corporation, Santa Clara, Calif.

[21] Appl. No.: 273,367

[22] Filed: Jul. 11, 1994

Related U.S. Application Data

[63] Continuation of Ser. No. 809,784, Dec. 18, 1991, abandoned.

[51] Int. Cl.$^6$ .................................................. G06F 12/06
[52] U.S. Cl. .................. 395/497.01; 395/405; 395/406; 395/481; 395/413; 395/600
[58] Field of Search ............................ 395/431, 456, 395/480, 497.04, 405, 406, 481, 413, 497.01

[56] References Cited

U.S. PATENT DOCUMENTS

| | | | |
|---|---|---|---|
| 4,757,438 | 7/1988 | Thatte et al. | 364/200 |
| 4,989,137 | 1/1991 | Oxley et al. | 395/413 |
| 5,109,336 | 4/1992 | Guenther et al. | 395/425 |
| 5,119,291 | 6/1992 | Flannagan et al. | 395/400 |
| 5,226,145 | 7/1993 | Moronaga et al. | 395/425 |
| 5,233,701 | 8/1993 | Nakata | 395/480 |
| 5,237,673 | 8/1993 | Orbits et al. | 395/425 |
| 5,237,681 | 8/1993 | Kagan et al. | 395/600 |
| 5,247,634 | 9/1993 | Cline et al. | 395/425 |
| 5,276,874 | 1/1994 | Thomson | 395/600 |
| 5,339,411 | 8/1994 | Heaton, Jr. | 395/497.02 |

*Primary Examiner*—Reba I. Elmore
*Attorney, Agent, or Firm*—Blakely, Sokoloff, Taylor & Zafman

[57] ABSTRACT

In a computer system having a CPU coupled to a memory wherein the memory is logically divided into a number of logical units, each having a number of memory words, a free memory block header list having a number of free memory block headers, one for each free memory block of a memory pool having a number of the memory words, is provided for tracking free memory blocks in the memory pool. The free memory block headers are organized as a Cartesian binary tree. The free memory block header list is used and maintained to control dynamic allocation and deallocation of free and allocated memory blocks of the memory pool. The memory pool is designed to have a memory pool size in multiples of the memory's logical units. All memory requests are rounded to multiples of the memory's word size. As a result, free and allocated memory blocks of the memory pool may be dynamically allocated and deallocated independent of how the memory is addressed, in particular, whether the memory is virtually or statically addressed.

18 Claims, 9 Drawing Sheets

METHOD AND APPARATUS FOR DYNAMIC MEMORY MANAGEMENT BY ASSOCIATION OF FREE MEMORY BLOCKS USING A BINARY TREE ORGANIZED IN AN ADDRESS AND SIZE DEPENDENT MANNER

This is a continuation of application Ser. No. 07/809,784, filed Dec. 18, 1991, abandoned.

BACKGROUND OF THE INVENTION

1. Field of the Invention

The present invention relates to the fields of computer systems, their memory controllers, operating systems, runtime libraries of programming languages, and the like. More specifically, the present invention is related to dynamic memory management in these systems and subsystems.

2. Art Background

Dynamic management of memory, that is dynamic allocation and deallocation of memory to executing programs, regardless of whether it is implemented in a memory controller, an operating system, a runtime library of a programming language, or the like, allows more efficient utilization of the available memory pool. Traditionally, a memory pool is dynamically managed using one of five well known classical methods; namely, First Fit, Best Fit, Buddy, Left Most and Better Fit. Each of the classical dynamic memory management methods has its advantages and disadvantages. Preferences typically depend on trade-offs between performance verses memory utilization.

Under the First Fit and Best Fit methods, performance is traded off for fuller memory utilization. The small typically useless memory fragments resulting from repeated allocations and deallocations are still tracked and chained in the free memory list at the expense of increased allocation time. In contrast, the Buddy method trades off memory utilization for performance. By rounding memory request up to an allowable size, the Buddy method eliminates these small useless memory fragments and therefore the time wasted on chaining them in the free memory list at the expense of wasted memory.

Similarly, the Left Most Fit method trades memory utilization for performance. By allocating only from the left side of the free memory tree, the Left Most Fit method improves allocation time at the expense of an unbalanced free memory tree with small useless memory fragments accumulated on the right hand side of the free memory tree. Likewise, the Better Fit method trades performance for memory utilization. By allocating from both sides of the free memory tree and preserving the larger memory fragments, the Better Fit method reduces the small useless memory fragments at the expense of allocation time.

However, all five classical methods do share one common disadvantage in that none of the methods is designed to sustain the same level of performance and memory utilization tradeoff on a virtual as well a static memory architecture. In a virtual memory architecture, addressable memory is mapped into a contiguous space, whereas, in a static memory architecture, memory is addressed in a hardware dependent manner. Particular examples of virtual and static memory architectures are the UNIX™ system and the Disk Operating System (DOS) respectively (UNIX is a registered trademark of the UNIX System Laboratory). As a result, it severely limits the portability of any dynamic memory management implementation based on one of these five classical methods across different memory architecture.

Thus, it is desirable to implement dynamic memory management in a manner that is at least comparable to the classical methods in performance and memory utilization tradeoffs and at the same time it is portable across different memory architectures. As will be disclosed, the present invention provides a method and apparatus for portable dynamic memory management that achieves the desirable result.

SUMMARY OF THE INVENTION

A method and apparatus for portable dynamic memory management is disclosed, which has particular application to memory controllers, operating systems, programming language runtime libraries and the like. Under the present invention, in a computer system comprising a central processing unit (CPU) and a memory coupled to the CPU, a free memory block header list is provided for tracking free memory blocks. The free memory block header list comprises a plurality of free memory block headers, one for each free memory block. The free memory block headers are organized into a Cartesian binary tree based on the free memory blocks' addresses and sizes. In addition to the address and size of the free memory block, each free memory block header also comprises addresses of their left and right descendant free memory blocks.

Additionally, an allocate, a reallocate and a deallocate procedure is provided for allocating, reallocating and deallocating memory blocks. Acquisition of memory for a memory pool is rounded to multiples of the system's page or segment size. All memory allocation and reallocation requests are rounded to multiples of the system's word size. The length of an allocated memory block is tracked in the lower memory word(s) of the allocated memory block, aligned to the system's word boundary if necessary.

The allocate, reallocate and deallocate procedures allocate, reallocate and deallocate memory blocks using the free memory block header list. An insert, a delete, a demote and a reclaim procedure is provided to manage addition of free memory block headers to the free memory block header list, deletion of free memory block headers from the free memory block header list, reordering of the free memory block headers in the free memory block header list, and coalescing adjacent free memory block headers.

As a result, memory on the computer system is allocated and deallocated dynamically with performance and utilization tradeoffs comparable to the classical methods. Furthermore, the performance and utilization tradeoffs are substantially sustained regardless of whether the present invention is implemented for a virtual or a static memory architecture.

BRIEF DESCRIPTION OF THE DRAWINGS

The objects, features and advantages of the present invention will be apparent from the following detailed description of the preferred embodiment of the invention with references to the drawings in which.

NOTATIONS AND NOMENCLATURE

Figure 1:
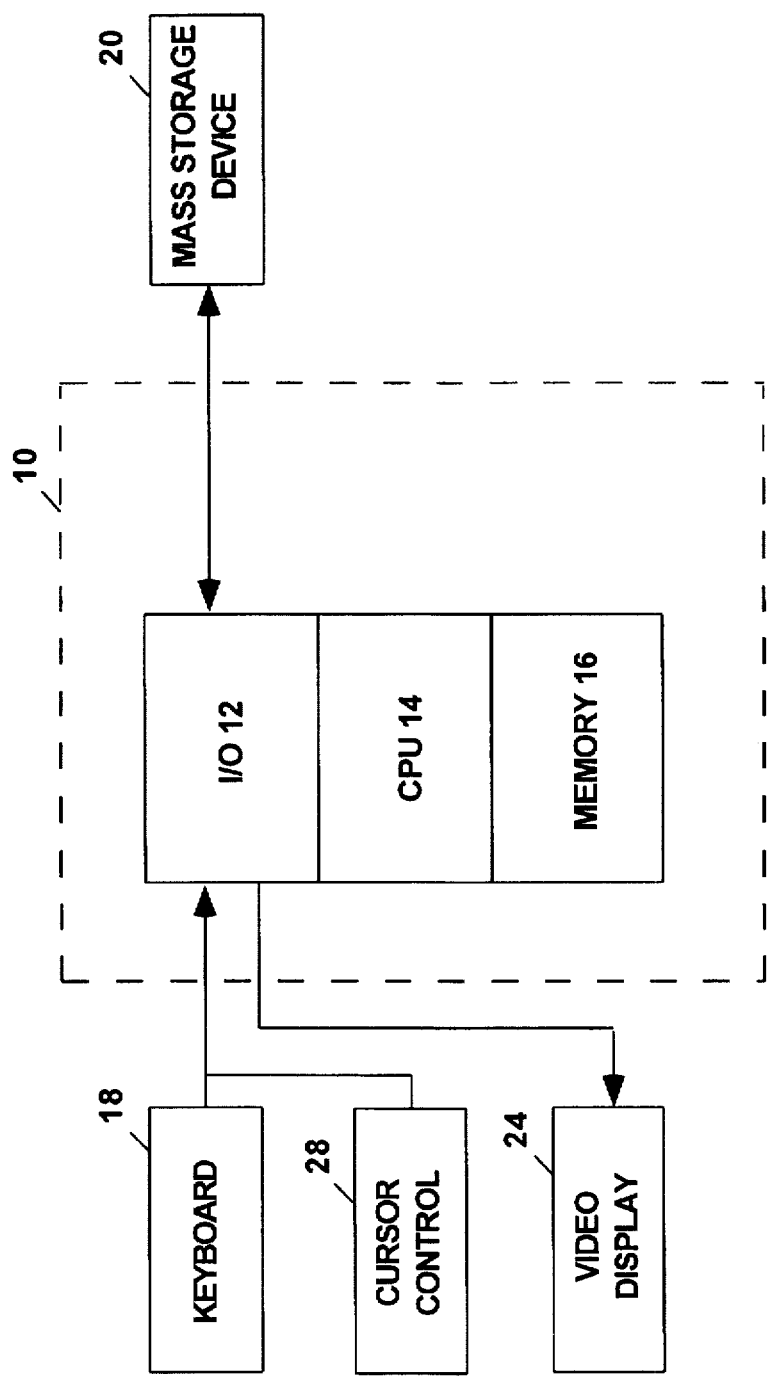
FIG. 1 shows a physical view of the hardware elements of a computer system embodying the portable dynamic memory management teachings of the present invention.

The detailed description which follows is presented largely in terms of program procedures executed on a computer. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for portable dynamic memory management is disclosed, which has particular application to memory controllers, operating systems, runtime libraries of programming languages and the like. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a block diagram illustrating a computer system embodying the portable dynamic memory management teachings of the present invention is shown. Shown is a computer 10 which comprises three major components 12, 14, and 16. The first of these is an input/output (I/O) circuit 12 which is used to communicate information in appropriately structured form to and from other portions of the computer 10. In addition, the computer 10 includes a central processing unit (CPU) 14 coupled to the I/O circuit 12, and a memory 16. The I/O circuit 12, the CPU 14 and the memory 16 are those typically found in most general purpose computers.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14. Any well known variety of raster displays may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. Any well known variety of cursor control devices may be utilized as cursor control device 28.

In fact, the several hardware elements illustrated are intended to represent a broad category of computer systems. Particular examples include computer systems based on 80×86 microprocessors manufactured by Intel Corporation of Santa Clara, Calif. Other computer systems having like capabilities may of course be adapted in a straight forward manner to perform the functions described below.

Figure 2:
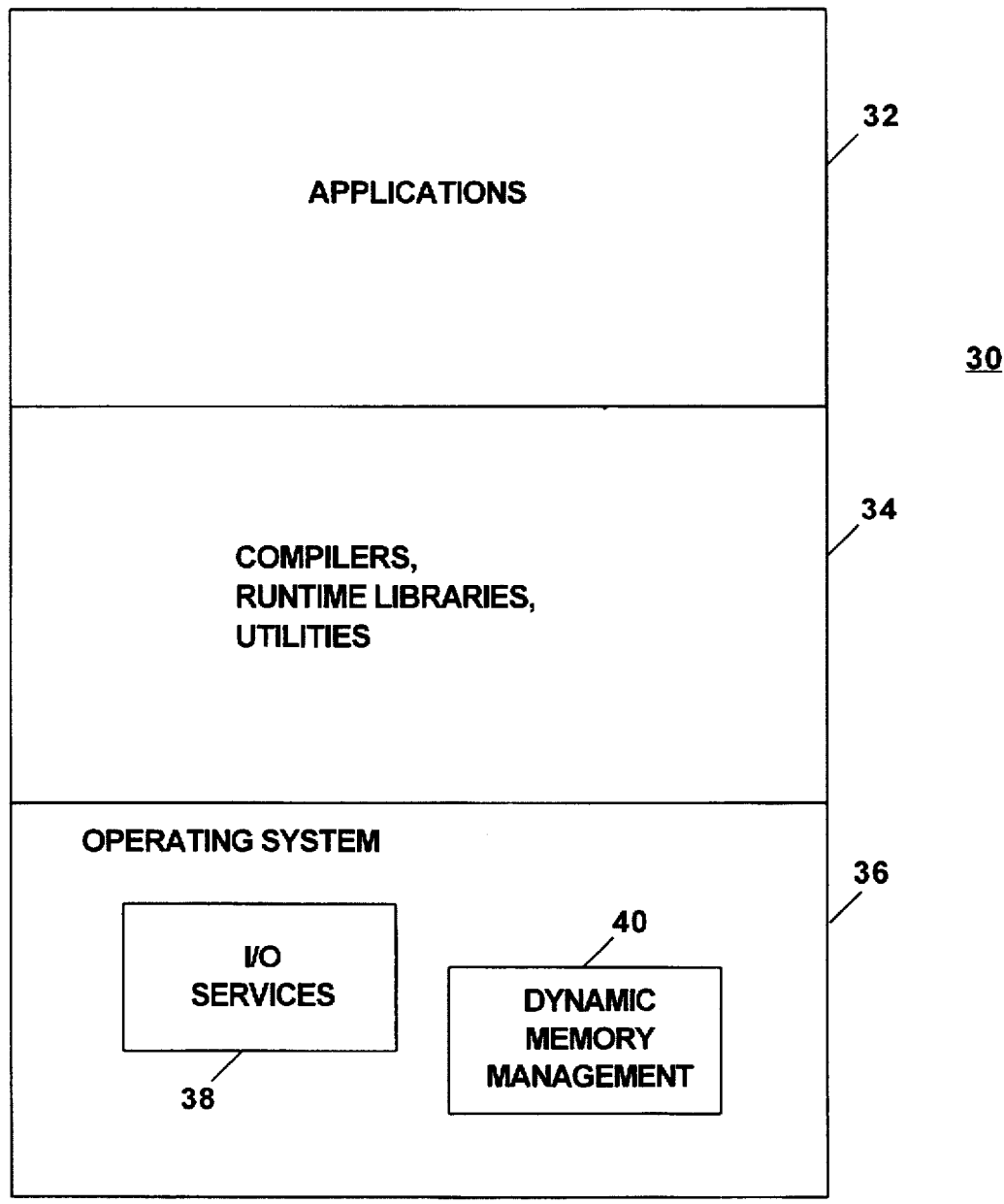
FIG. 2 shows a logical view of the software elements of the computer system illustrated in FIG. 1.

Referring now to FIG. 2, a block diagram illustrating a logical view of the software elements of the computer system illustrated in FIG. 1 is shown. Shown is an operating system 36 providing various system services to other programs executing on the computer system. In particular, the operating system 36 provides input/output (I/O) services 38 for accessing any I/O devices and dynamic memory management 40 for managing allocation and deallocation of the computer system's memory to executing programs in accordance to the teachings of the present invention. As will be described, it is immaterial whether operating system 36 provides virtual memory addressing similar to the memory addressing found in the well known UNIX™ system, or static memory addressing similar to the memory addressing found in the well known DOS.

Also shown are programming language compilers, software tools/utilities and their runtime libraries 34 for application development and execution. The applications 32 executing on the computer system utilize the underlying system services offered by runtime libraries 34 and the operating system 36. These software elements are those typically found in most general purpose computer systems and almost all special purpose computer systems.

Although the dynamic management of memory allocation and deallocation of the present invention is shown to be implemented as part of the operating system 36, the present invention may also be implemented as part of the memory controllers of various memory units, the runtime libraries of the various programming languages, and the like. In fact, the present invention may be implemented as part of any system or subsystem that manages memory allocation of a memory pool. The portability advantage of the present invention will be maintained by having the implementing runtime library or the like acquires memory for its memory pool in multiples of the system's memory page or segment size.

Figure 3:
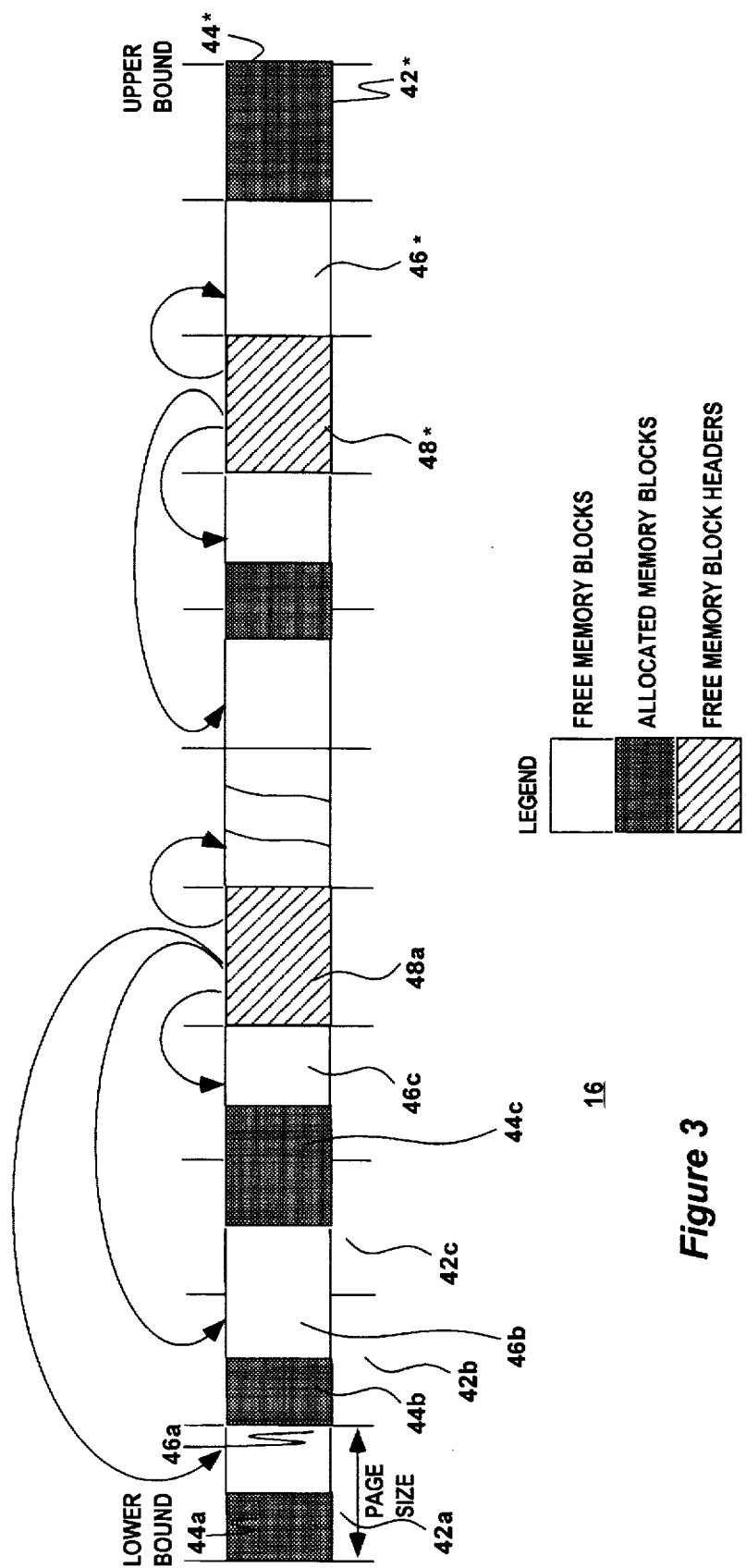
FIG. 3 shows a logical view of the memory architecture of the computer system illustrated in FIG. 1.

Referring now to FIG. 3, the memory architecture of the computer system illustrated in FIG. 1 is shown. Shown is the memory 16 logically divided into a plurality of fixed size memory pages/segments, 42a–42*. Each memory page/segment, 42a, ..., or 42*, comprises a plurality of memory words. Also shown are allocated memory blocks 44a–44*, and free memory blocks 46a–46* (unallocated). Each allocated/free memory blocks 44a, ..., 44*, 46a, ..., or 46*, comprises a plurality of contiguous memory words that may or may not span multiple memory pages/segments 42a–42*.

Also shown is a plurality of memory blocks, 48a–48* allocated for storing free memory block headers. The free memory block headers point to the free memory blocks 46a–46*. There is one free memory block header for each free memory block 46a–46*. Additionally, the free memory block headers are logically organized as a Cartesian binary tree to facilitate dynamic allocation and deallocation of free memory blocks 46a–46*. Collectively, the free memory block headers form a free memory block header list. The organization of the free memory block headers and their usage will be described in further detail below.

Although the free memory block headers are shown to be stored in memory blocks 48a–48* having sizes of a memory page/segment, it will be appreciated that the free memory block headers may be stored in memory blocks having sizes smaller or greater than a memory page/segment.

Figure 4:
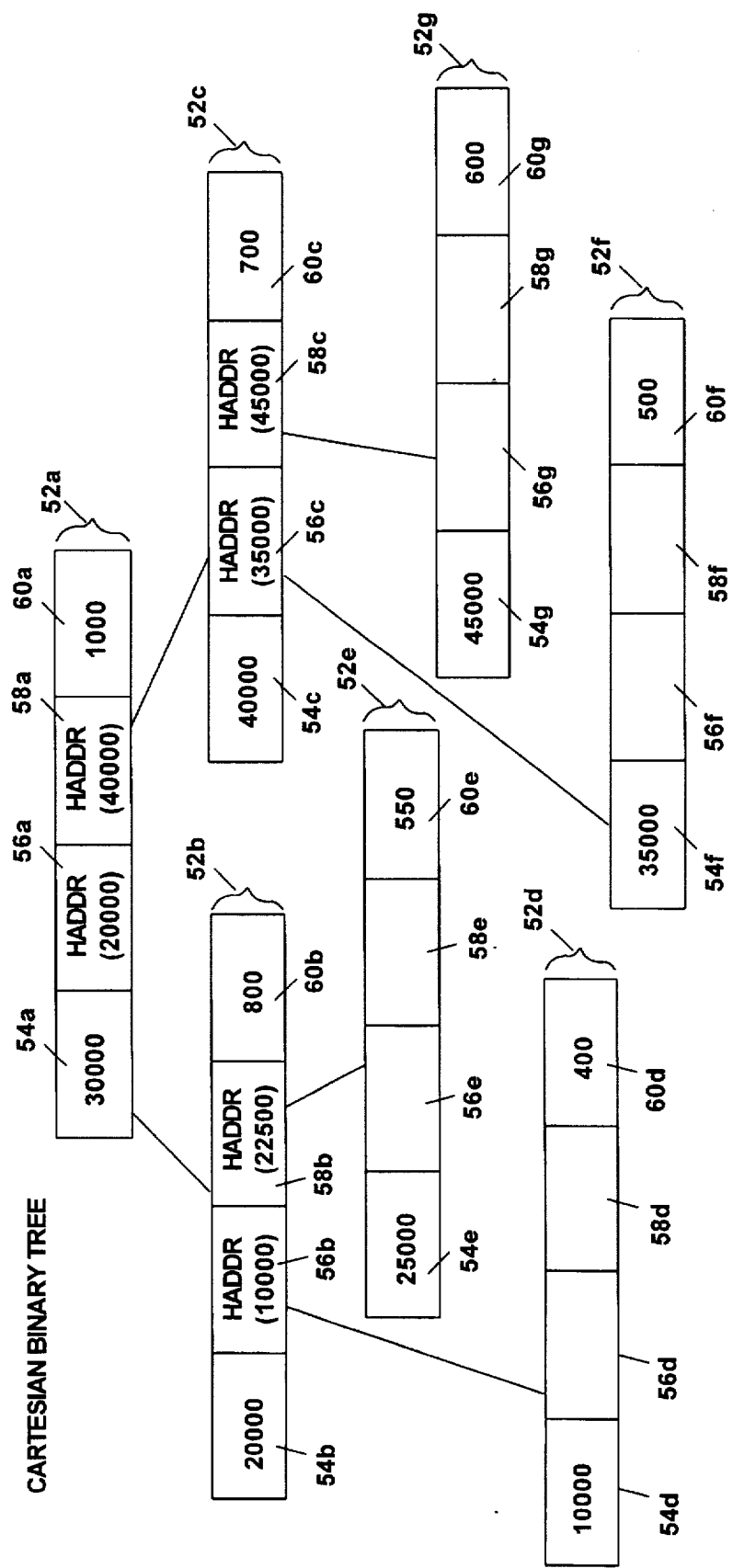
FIG. 4 shows a logical view of an exemplary free memory block header list illustrating the free memory block header list structure and the free memory block headers of the present invention.

Referring now to FIG. 4, a block diagram illustrating an exemplary free memory block header list comprising exemplary free memory block headers of the memory illustrated in FIG. 3 is shown. Shown is an exemplary free memory block header list 50 comprising a mot free memory block header 62a, and a plurality of descendant free memory block header 62b–62f. Each of the exemplary free memory block header, 62a, ... or 62g, corresponds to a free memory block currently not allocated to any executing program.

The exemplary free memory block header list 50 is organized as a Cartesian binary tree as follows:

1) both first generation descendant free memory blocks corresponding to the first generation descendant free memory block headers 52b and 52c of the mot free memory block header 52a are smaller that the root free memory block; additionally, the first generation left descendant free memory block has a lower address and the first generation right descendant free memory has a higher address than the address of the mot free memory block;

2) both second generation descendant free memory blocks corresponding to the second generation descendant free memory block headers 52d and 52e of the first generation left descendant free memory block header 52b are smaller that the first generation left descendant free memory block; additionally, the second generation left descendant free memory block has a lower address and the second generation right descendant free memory has a higher address than the address of the first generation left descendant free memory block; and 3) both second generation descendant free memory blocks corresponding to the second generation descendant free memory block headers 52f and 52g of the first generation right descendant free memory block header 52c are smaller that the first generation right descendant free memory block; additionally, the second generation left descendant free memory block has a lower address and the second generation right descendant free memory has a higher address than the address of the first generation right descendant free memory block.

In general, a free memory block header list is organized as a Cartesian binary tree having the following properties:

For any free memory block header E, if F(E) denotes the descendants of E, Left(F(E)) denotes the left descendants of E, and Right(F(E)) denotes the right descendants of E, then for all i in Left(F(E)) and all j in Right(F(E)), address(i)<address(E)<address(j), and length(i)<= length(E)=>length (j).

As illustrated by the exemplary free memory block header list 50, each free memory block header, 52a, ..., or 52g, comprises a free memory block address, 54a, ..., or 54g, and a free memory block size, 60a, ..., or 60g. The free memory block address, 54a, ... or, 54g, identifies the starting location of the corresponding free memory block, whereas, the free memory block size, 60a, ..., or 60g, identifies the size of the corresponding free memory block.

Additionally, each free memory block header, 52a, ..., or 52g, further comprises a left descendant free memory block header address, 56a, ..., or 56g, and a right descendant free memory block header address, 58a, ..., or 58g. If a free memory block header has a left descendant free memory block header, 52a, 52b, or 52c, the left descendant free memory block header address, 56a, 56b, or 56c identifies the starting location of the left descendant free memory block header, 52b, 52d, or 52f; otherwise, 52d, 52e, 52f, or 52g, the left descendant free memory block header address, 56d, 56e, 56f, or 56g contains a null pointer. Similarly, if a free memory block header has a right descendant free memory block header, 52a, 52b, or 52c, the right descendant free memory block header address, 58a, 58b, or 58c identifies the starting location of the right descendant free memory block header, 52c, 52e, or 52g; otherwise, 52d, 52e, 52f, or 52g, the right descendant free memory block header address, 58d, 58e, 58f, or 58g contains a null pointer.

Although all free memory block headers with no descendant, 52d, 52e, 52f and 52g, were shown in FIG. 4 as having neither left nor right descendant free memory block headers at the same time, it will be appreciated that a free memory block header may have a left descendant free memory block header and no right descendant free memory block header, or vice versa.

Figure 5:
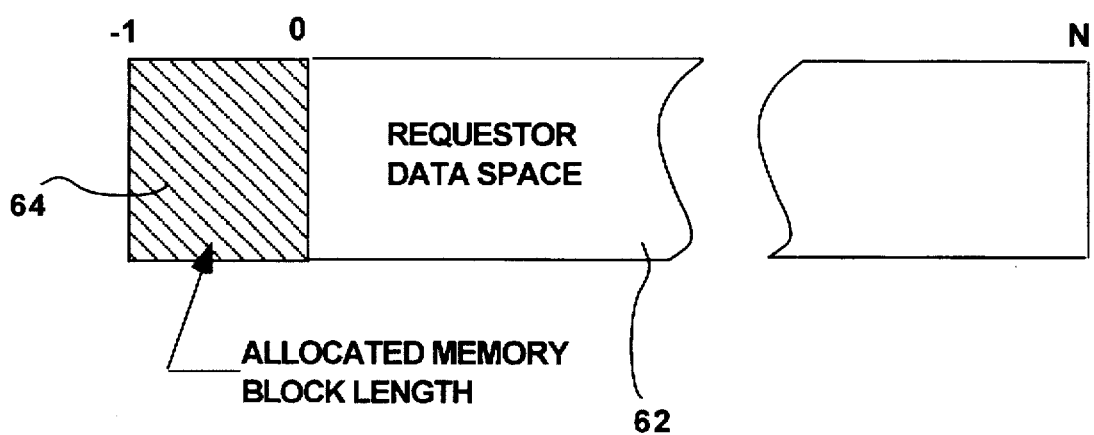
FIG. 5 shows a logical view of an allocated memory block of the present invention.

Referring now to FIG. 5, a block diagram illustrating an allocated memory block of the memory illustrated in FIG. 3 is shown. An allocated memory block 44 comprises at least one memory word 64 for storing the allocated memory block's block length and a plurality of memory words 62 allocated to the requestor. Under the present invention, allocation of memory is rounded to the nearest multiples of system word size. The allocated memory block length is stored into the lower memory word(s) of the allocated memory block, aligned to the system's word boundary if necessary. Additionally, if the present invention is implemented in a programming language runtime library or the like, acquisition of memory for the memory pool is further rounded to the nearest multiple of the system's page or segment size.

Figure 6:
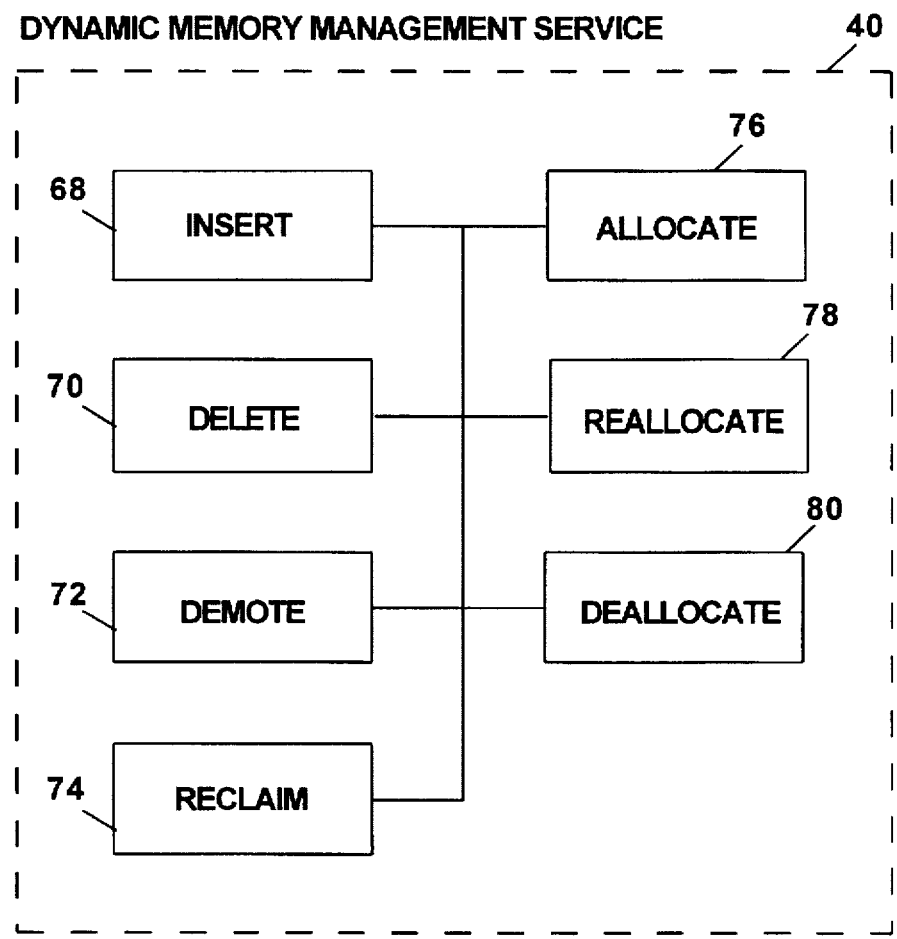
FIG. 6 shows a functional view of the dynamic memory management services of one implementation of the present invention at the operating system level.

Referring now to FIG. 6, a block diagram illustrating the dynamic memory management services of the operating system illustrated in FIG. 2 is shown. The dynamic memory management services 40 comprise a memory allocation procedure 76, a memory reallocation procedure 78, and a memory deallocation procedure 80. The allocate, reallocate and deallocate procedures 76–80 are used to allocate, reallocate and deallocate memory blocks. Additionally, the dynamic memory management services 40 further comprise an insert procedure 68, a delete procedure 70, a demote procedure 72 and a reclaim procedure 74. The insert, delete, demote and reclaim procedures 68–74 are used by the allocate, reallocate and deallocate procedures 76–80 to maintain the free memory block header list described earlier.

Still referring to FIG. 6, upon receipt of a memory allocation request, the allocate procedure 76 rounds the request size upward to the nearest multiple of the system word size. The allocate procedure 76 then searches the free memory block header list for a free memory block to allocate. Upon locating the free memory block, the allocate procedure 76 allocates the rounded amount of memory words to the requestor. The allocate procedure 76 writes the allocated memory block size into the lower bound memory word(s) of the allocated memory block as illustrated earlier, and calls the delete or demote procedure 70 or 72 to update the free memory block header list, before returning the starting address of the allocated memory block to the requestor. The allocate procedure 76 makes the necessary alignment when writing the allocated memory block size into the lower bound memory word(s).

The allocate procedure 76 searches the free memory block header list for a free memory block to allocate, starting with the root free memory block header traversing down through the descendant free memory block headers until the sizes of the corresponding free memory blocks of both descendant free memory block headers are too small or there are no more descendant free memory block headers. At each decision point, if both free memory blocks corresponding to the descendant free memory block headers can satisfy the request, the allocate procedure 76 traverse down the descendant free memory block header with the smaller free memory block.

The allocate procedure 76 calls the delete procedure 70 to delete the corresponding free memory block header from the free memory block header list if the entire located located free memory block is allocated to the requestor. The allocate procedure 76 calls the demote procedure 72 to reorder the free memory block header list if the located free memory block is being split and only a portion of the located free memory block is allocated to the requestor.

By adjusting the rounding and alignment to the system word size, the allocate procedure 76 is made portable to different systems. In its presently preferred form, a rounding constant (WORDSIZE) and an alignment constant (ALIGNSIZE) is used to provide the allocate procedure 76 with the necessary information. Additionally, in its presently preferred form, the allocate procedure 76 is provided with the ability to initialize the allocated memory block at the request of the requestor before returning to the requestor.

If the allocate procedure 76 is implemented as part of the a runtime library of a programming language or the like, it is also provided with the ability of acquiring additional memory from the operating system for its memory pool in multiples of the system's page or segment size. In that case, the allocate procedure 76 calls the insert procedure to update the free memory block header list. Similarly, an acquisition constant (SYSPAGE) is used to inform the allocate procedure 76 the system's page or segment size.

Pseudo code for the key code segments of one implementation of the allocate procedure 76 is shown in a substantially C-like language in Appendix A. The allocate procedure 76 as pseudo coded was implemented and incorporated into a C runtime library on a UNIX™ system running on an Intel i386™ microprocessor based computer system, and into a C runtime library on a DOS system running also on an Intel i386™ microprocessor based computer system (i386™ is a registered trademark of Intel Corporation). The acquisition constant (SYSPAGE) was set to 2000H on the UNIX™ system, and to FFFFH on the DOS system. The rounding constant (WORDSIZE) was set to 4 bytes on the UNIX™ system, and 2 bytes on the DOS system. The alignment constant (ALIGNSIZE) was set to 4 bytes on the UNIX™ system, and 0 bytes on the DOS system.

Still referring to FIG. 6, upon receipt of a reallocate request, the reallocate procedure 78 either decrease or increases the allocated memory block depending on the request. In the case of decreasing the allocated memory block, the reallocate procedure 78 reduces the memory allocation. The reallocate procedure 78 updates the allocated memory block length, preserves the data within the reduced allocated memory block, and calls the deallocate procedure 80 to deallocate the portion of the previously allocated memory block that is no longer required, before returning to the requestor.

In the case of increasing the allocated memory block, the reallocate procedure 78 increases the memory allocation if possible. The reallocate procedure 78 calls the reclaim procedure 74 to determine if there is a free memory block adjacent to the allocated memory block, if so, coalesce them together. If the reclaim procedure 74 is successful in coalescing the allocated memory block with an adjacent free memory block, and the combined memory block is at least as large the new size requested, the reallocate procedure 78 allocates the combined memory block, preserves existing data in the previously allocated memory block, and calls the delete procedure 70 to update the free memory block header list. Additionally, if the combined memory block is larger than the new size requested, the reallocate procedure 78 reduces the combined memory block to the requested new size before allocating the combined memory block.

If the reclaim procedure 74 is unsuccessful in enlarging the allocated memory block to the requested new size, the reallocate procedure 78 then calls the allocate procedure 76 to allocate a new free memory block of the requested size, transfers the data in the previously allocated memory block to the newly allocated memory block, and calls the deallocate procedure 80 to deallocated the previously allocated memory block.

Pseudo code for the key code segments of one implementation of the reallocate procedure 78 is shown in a substantially C-like language in Appendix B. Similarly, the reallocate procedure 78 as pseudo coded was implemented and incorporated into the C runtime libraries described earlier. Only one minor emulation was necessary to incorporate the reallocate procedure 78 into the C runtime library on the DOS system described earlier. The sbrk() kernel memory facility on the UNIX™ system was emulated by the DOS interrupt 48H.

Still referring to FIG. 6, upon receipt of a deallocate memory request, the deallocate procedure 80 deallocates the previously allocated memory block. The deallocate procedure 80 searches the free memory block header list to determine if the memory block being deallocated has adjacent free memory block or not. If so, the deallocate procedure 80 coalesce these adjacent free memory blocks with the memory block being deallocated, and calls the delete procedure 70 to delete the free memory block headers of the adjacent free memory blocks from the free memory block header list. The deallocate procedure 80 then calls the insert procedure 68 to insert the corresponding free memory block header for the memory block being deallocated, with or without coalesced adjacent free memory blocks, into the free memory block header list at the appropriate point.

Pseudo code for the key code segments of one implementation of the deallocate procedure 80 is shown in a substantially C-like language in Appendix C. Similarly, the deallocate procedure 80 as pseudo coded was implemented and incorporated into the C runtime libraries described earlier.

Still referring to FIG. 6, upon receiving an insertion request, the insert procedure 68 locates the correct position with respect to the existing free memory block headers within the free memory block header list, and inserts a free memory block header. The insert procedure 68, starting from the root free memory block header, performs a binary search for the first free memory block with a free memory block size less than the free memory block size of the free memory block whose header is to be inserted into the header list. The insert procedure 68 traverses down the left descendant if the address of the free memory block whose header is to be inserted is smaller than the address of the corresponding free memory block of the current free memory block header, otherwise, the insert procedure 68 traverses down the right descendant.

Upon locating the proper insertion point, the insert procedure 68 updates the descendant pointer of the predecessor free memory block header to point to the free memory block header being inserted, and the descendant pointer of the free memory block header being inserted to point to the previous descendant accordingly. In the event that the free memory block whose header is to be inserted into the header list is the smallest free memory block, the null descendant pointer of the predecessor free memory block header is updated to point to the free memory block header being inserted, and the descendant pointer of the free memory block header is set to null.

Pseudo code for the key code segments of one implementation of the insert procedure 68 is shown in a substantially C-like language in Appendix D. Similarly, the insert procedure 68 as pseudo coded was implemented and incorporated into the C runtime libraries described earlier.

Figure 7A:
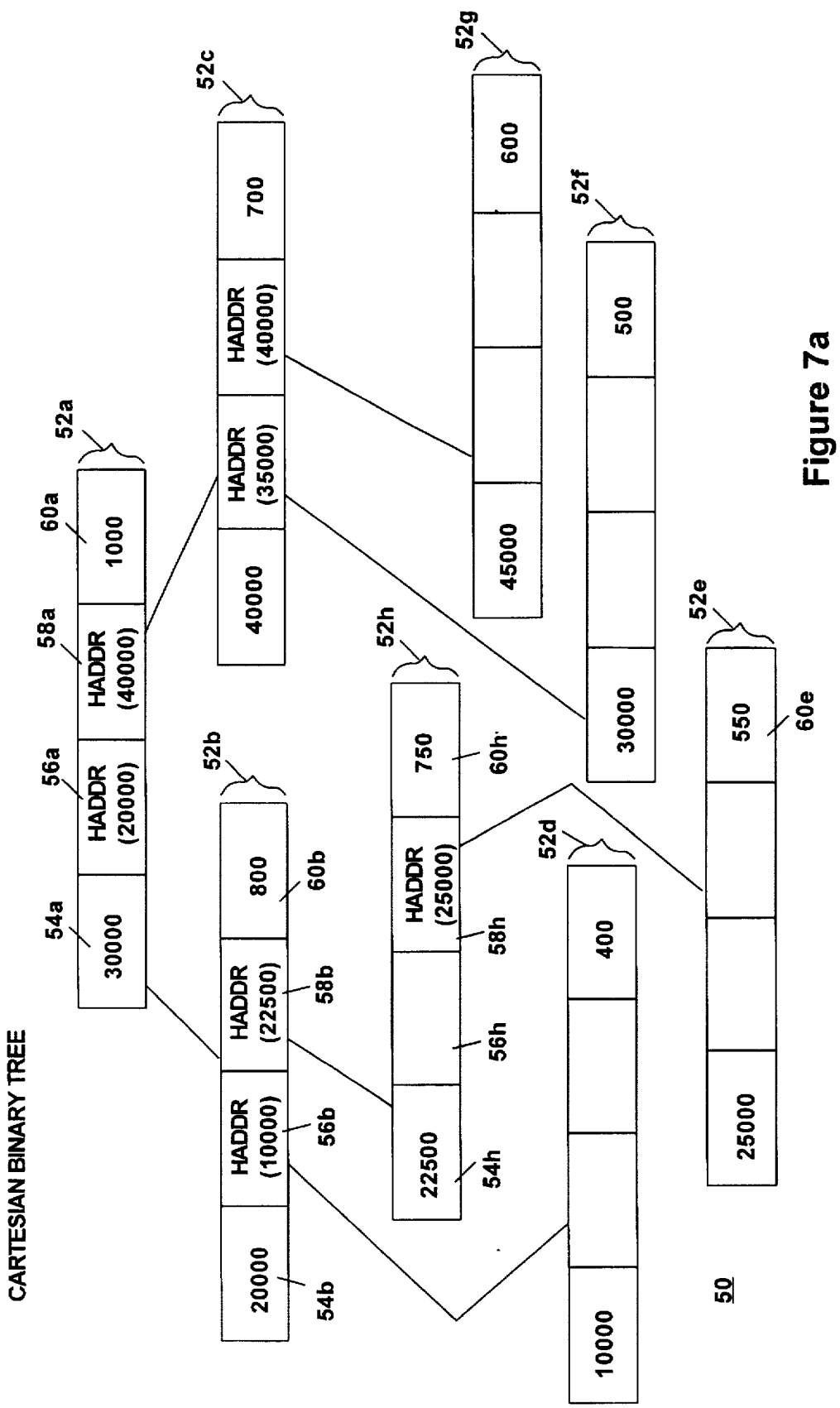
FIGS. 7a–7c show an exemplary insertion, an exemplary deletion and an exemplary demotion of a free memory block header illustrating maintenance of the free memory block header list of the present invention.

FIG. 7a illustrates an exemplary insertion of an exemplary free memory block header into the exemplary free memory block header list illustrated in FIG. 4. Shown is the exemplary free memory block header list 50 illustrated in FIG. 4 having the exemplary free memory block header 52h inserted into it.

Initially, the insert procedure compares the length of the free memory block 60h corresponding to the free memory block header 52h with the length of the free memory block 60a corresponding to the root free memory block header 52a. Since the length of the free memory block 60h corresponding to the free memory block header 52h is smaller, the insert procedure traverses to one of the first generation free memory block headers 52b or 52c. The insert procedure traverses to the left descendant, since the address of the free memory block 54h corresponding to the free memory block header 52h is smaller than the address of the free memory block 54a corresponding to the root free memory block header 52a.

Then, the insert procedure compares the length of the free memory block 60h corresponding to the free memory block header 52h with the length of the free memory block 60b corresponding to the first generation free memory block header 52b. Since the length of the free memory block 60h corresponding to the free memory block header 52h is smaller, the insert procedure traverses to one of the second generation free memory block headers 52d or 52e. The insert procedure traverses to the right descendant, since the address of the free memory block 54h corresponding to the free memory block header 52h is greater than the address of the free memory block 54b corresponding to the first generation free memory block header 52b.

Again, the insert procedure compares the length of the free memory block 60h corresponding to the free memory block header 52h with the length of the free memory block 60e corresponding to the second generation free memory block header 52e. Since the length of the free memory block 60h corresponding to the free memory block header 52h is greater, the correct insertion point is found. As illustrated, the right descendant pointer 58b of the first generation free memory block header 52b is updated to point to the address of the free memory block header 52h. Additionally, the right descendant pointer 58h of the free memory block header 52h is updated to point to the free memory block header 52e.

Referring back to FIG. 6, upon receipt of a delete request, the delete procedure 70 merges the left and right descendant free memory block headers of the deleted free memory block header as either the left or right descendant free memory block headers of the deleted free memory block headers predecessor free memory block header, depending on whether the deleted free memory block header is a left or a right descendant of its predecessor free memory block header. If the deleted free memory block header is the root free memory block header, the delete procedure 70 merges the left and right descendant free memory block headers of the deleted root free memory block headers to form a new free memory block header list. In either case, the descendant pointers are updated accordingly.

Pseudo code for the key code segments of one implementation of the delete procedure 70 is shown in a substantially C-like language in Appendix E. Similarly, the delete procedure 70 as pseudo coded was implemented and incorporated into the C runtime libraries described earlier.

Figure 7B:
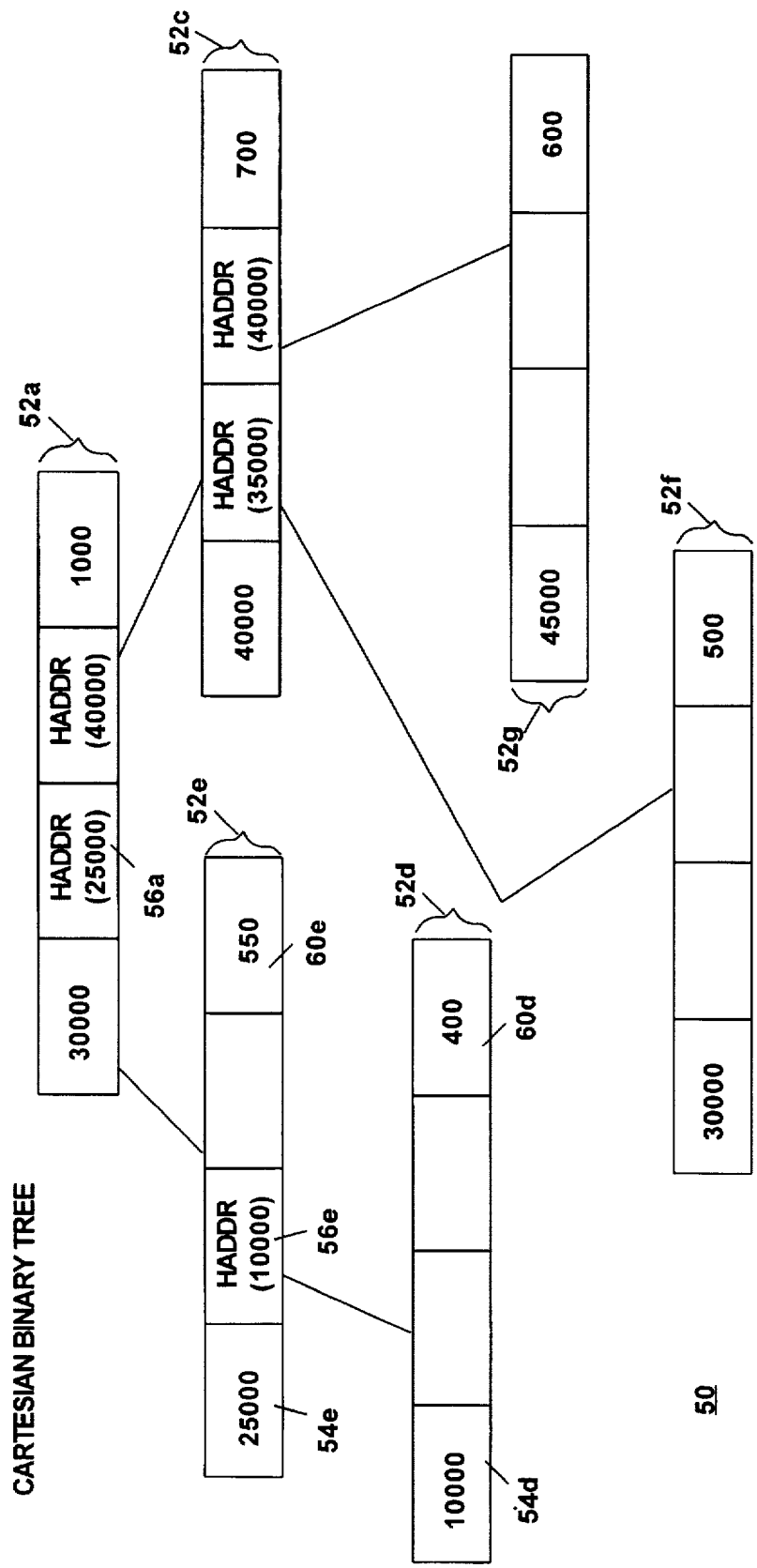

FIG. 7b illustrates an exemplary deletion of one of the exemplary free memory block header from the exemplary free memory block header list illustrated in FIG. 4. Shown is the exemplary free memory block header list 50 having the free memory block header list corresponding to the free memory block with the starting address "20000" deleted.

Since the deleted free memory block header was a left descendant of the free memory block header 52a, the delete procedure merges the remaining left and right descendant free memory block headers 52d and 52e as the left descendant free memory block headers of the root free memory block header 52a, which was the predecessor free memory block header of the deleted free memory block header. The remaining free memory block header 52d becomes the left descendant free memory block header of the other remaining free memory block header 52e, since the size of the free memory block 60d corresponding to the remaining free memory block header 52d is smaller than the size of the free memory block 60e corresponding to the other remaining free memory block header 52e, and the address of the free memory block 54d corresponding to the remaining free memory block header 52d is also smaller than the address of the free memory block 54e corresponding to the other remaining free memory block header 52e.

As illustrated, the left descendant pointer 56a is updated to point to the free memory block header 52e. Additionally, the left descendant pointer 56e of free memory block header 52e is in turn updated to point to the free memory block header 52d.

Referring back to FIG. 6, upon receipt of a demote request, the demote procedure 72 reorders the free memory block header list. The free memory block headers for the pre-split free memory block and all its descendant free memory blocks are deleted from the free memory block list. A new free memory block header is created for the residual free memory block. The newly created free memory block header for the residual free memory block and the deleted free memory block headers for the descendant free memory blocks of the pre-split free memory block are reinserted into the free memory block list in the appropriate locations.

Pseudo code for the key code segments of one implementation of the demote procedure 72 is shown in a substantially C-like language in Appendix F. Similarly, the demote procedure 72 as pseudo coded was implemented and incorporated into the C runtime libraries described earlier.

Figure 7C:
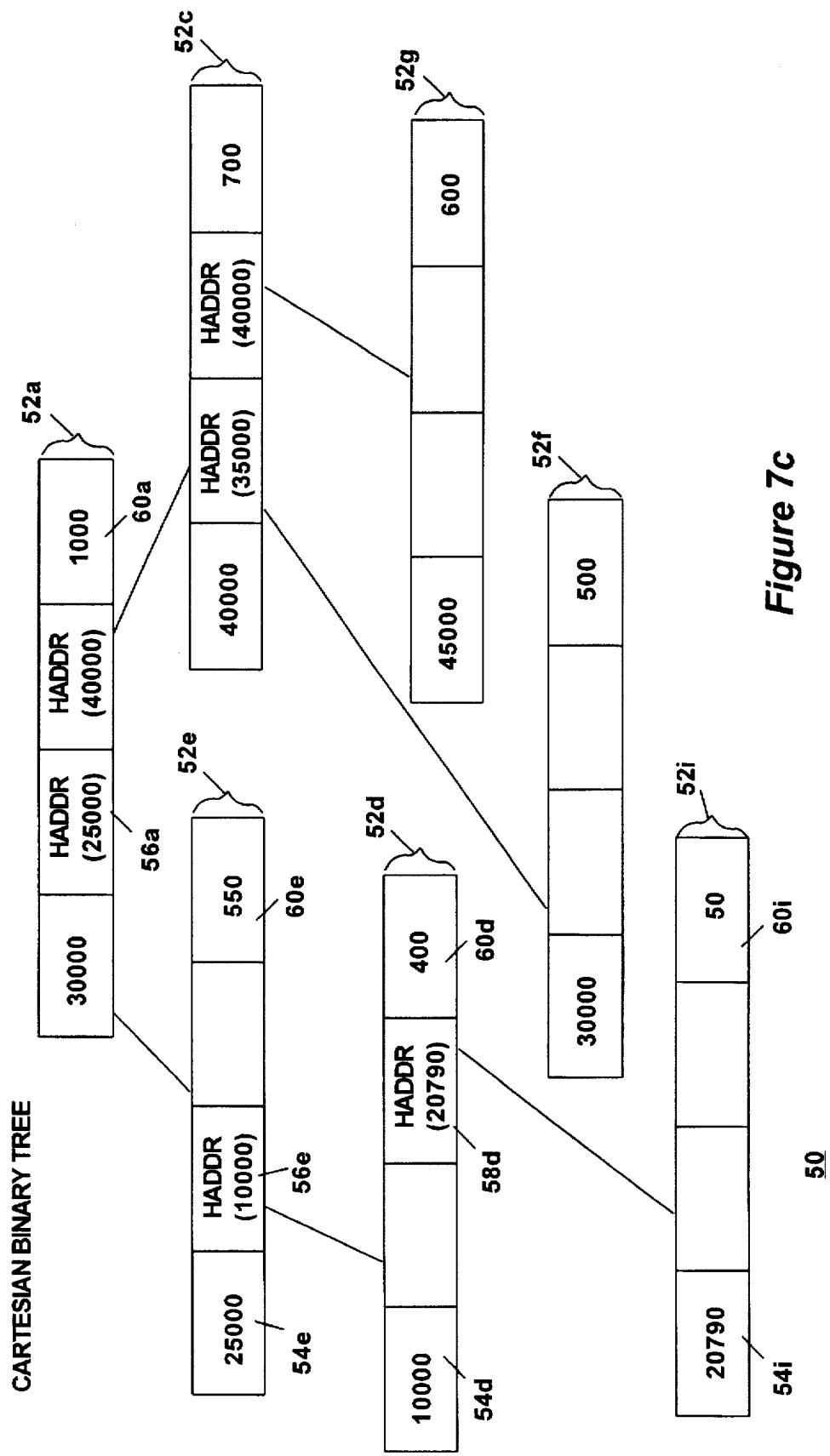

FIG. 7c illustrates an exemplary demotion of the exemplary free memory block header list illustrated in FIG. 4. Shown is the reordered exemplary free memory block header list 50 with the exemplary newly created free memory block header 52i for the residual free memory block from the pre-split free memory block with the starting address of "20000", and the former descendant free memory block headers of the pre-split free memory block header 52d and 52e, reinserted into the free memory block header list 50 in the appropriate locations. The exemplary residual free memory block is resulted from allocating 750 words out of the 800 words available in the free memory block with the starting address of "20000".

The free memory block header 52e becomes the left descendant free memory block header of the root free memory block header 52a, since the size of the corresponding free memory block 60e of free memory block header 52e is smaller than the size of the corresponding free memory block 60a of the root free memory block header 52a, and the address of the corresponding free memory block 54e of the free memory block header 52e is smaller than the address of the corresponding free memory block 54a of the root free memory block header 52a. Similarly, the free memory block header 52d becomes the left descendant free memory block header of the first generation free memory block header 52e, since the size of the corresponding free memory block 60d of free memory block header 52d is smaller than the size of the corresponding free memory block 60e of the first generation free memory block header 52e, and the address of the corresponding free memory block 54d of the free memory block header 52d is smaller than the address of the corresponding free memory block 54e of the first generation free memory block header 52e. Likewise, the new free memory block header 52i becomes the right descendant free memory block header of the first generation free memory block header 52e, since the size of the corresponding free memory block 60i of free memory block header 52i is smaller than the size of the corresponding free memory block 60d of the second generation free memory block header 52d, and the address of the corresponding free memory block 54i of the free memory block header 52i is larger than the address of the corresponding free memory block 54d of the second generation free memory block header 52d.

As illustrated, the left descendant pointer 56a is updated to point to the free memory block header 52e, the left descendant pointer 56e of free memory block header 52e is updated to point to the free memory block header 52d, and the right descendant pointer 58d of free memory block header 52d is updated to point to the free memory block header 52i.

Referring back to FIG. 6, upon receipt of a reclaim request, the reclaim procedure 74 determines if there is a free memory block adjacent to the previously allocated memory block, and if so, coalesce them together. The reclaim procedure 74, searches for the adjacent free memory block, starting with the root free memory block header. At each decision point, the reclaim procedure 74 traverses down to the next generation left descendant if the address of the adjacent free memory block is smaller than the address of the free memory block corresponding to the current free memory block header, otherwise, down to the next generation right descendant. If the reclaim procedure 74 is successful in locating a free memory block adjacent to the previously allocated memory block, the reclaim procedure 74 calls the delete procedure 70 to delete the corresponding free memory block header for the adjacent free memory block. Additionally, if the combined free memory block is larger than the requested new size, the reclaim procedure 74 calls the deallocate procedure to deallocate the excess portion of the combined free memory block.

Pseudo code for the key code segments of one implementation of the reclaim procedure 74 is shown in a substantially C-like language in Appendix G. Similarly, the demote procedure 74 as pseudo coded was implemented and incorporated into the C runtime libraries described earlier.

While the method and apparatus of the present invention has been described in terms of its presently preferred form, those skilled in the art will recognize that the method of the present invention is not limited to the presently preferred form described. The method and apparatus of the present invention may be practiced with modification and alteration within the spirit and scope of the appended claims. Thus, the specification is to be considered as illustrative instead of restrictive on the present invention.

APPENDIX "A"

```
char *malloc( nbytes )
unsigned integer nbytes;
{
data_block db;
free_hdr p, *flp, left_branch, right_branch;
unsigned integer left_length, right_length;
   nbytes += sizeof( unsigned integer );
   if ( nbytes < SMALLEST_BLK )
      nbytes = SMALLEST_BLK;
   else
      nbytes = roundup( nbytes, WORDSIZE );
   if ( length( _root ) <= nbytes )
      if ( !morecore( nbytes ) )
         return( 0 );
   flp = address_of(_root);
   p = *flp;
   left_branch = p->left;
   right_branch = p->right;
   left_length = length( left_branch );
   right_length = length( right_branch );
   while ( left_length >= nbytes || right_length >= nbytes ) {
      if ( left_length <= right_length ) {
         if ( left_length >= nbytes ) {
            flp = address_of(p->left);
            p = left_branch;
         }
         else {
            flp = address_of(p->right);
            p = right_branch;
         }
```

APPENDIX "A" continued

```
    }
    else {
        if ( right_length >= nbytes ) {
            flp = address_of(p->right);
            p = right_branch;
        }
        else {
            flp = address_of(p->left);
            p = left_branch;
        }
    }
    left_branch = p->left;
    right_branch = p->right;
    left_length = length( left_branch );
    right_length = length( right_branch );
}
if ( ( p->size - nbytes ) <= SMALLEST_BLK ) {
    db = p->block;
    delete( flp );
}
else {
    data_block ndb;
    db = p->block;
    ndb = nextblk( db, nbytes );
    ndb->size = p->size = ( db->size - nbytes );
    p->block = ndb;
    demote( flp );
    db->size = nbytes;
}
return( address_of(db->data) );
}
```

APPENDIX "B"

```
char *realloc( ptr, nbytes )
char *ptr;
unsigned integer nbytes;
{
free_hdr *fp, p;
data_block oldblk, freeblk, oldrelative;
unsigned integer oldsize, newsize, size, oldrelsz;

if ( ptr < _lbound || ptr > _ubound ) {
        return( 0 );
    }
    oldblk = (ptr - WORDSIZE);
    oldsize = oldblk->size;
    oldrelative = nextblk( oldblk, oldsize );
    if ( reclaim( oldblk, oldsize, 1 ) == -1 ) {
        return( 0 );
    }
    newsize = nbytes + WORDSIZE;
    if ( newsize < SMALLEST_BLK ) {
        newsize = SMALLEST_BLK;
    }
    else {
        newsize = roundup( newsize, WORDSIZE );
    }
    if ( oldsize >= newsize ) {
        return( shrink( oldblk, oldsize, newsize) );
    }
```

APPENDIX "B" continued

```
if ( oldrelative < _ubound ) {
   flp = address_of(_root);
   p = *flp;
   oldrelsz = oldrelative->size;
   while ( (size = length( p )) >= oldrelsz ) {
      freeblk = p->block;
      if ( oldrelative < freeblk ) {
         flp = address_of(p->left);
         p = *flp;
      }
      else if ( oldrelative > freeblk ) {
         flp = address_of(p->right);
         p = *flp;
      }
      else {
         if ( oldsize + oldrelsz >= newsize ) {
            delete( flp );
            oldsize += oldrelsz;
            oldblk->size = oldsize;
            return( shrink( oldblk, oldsize, newsize ) );
         }
         else {
            break;
         }
      }
   }
}
ptr = malloc( nbytes );
if ( ptr != NULL ) {
   move( address_of(oldblk->data), ptr, oldsize );
   free( address_of(oldblk->data) );
}
return( ptr );
}
```

APPENDIX "C"

```
free( ptr )
char *ptr;
{
unsigned integer nbytes, relative_size;
free_hdr *flp, relative;
data_block relative_block, oldblk;

if ( ptr < _lbound || ptr > _ubound ) {
      return( -1 );
   }
   oldblk = address_of(ptr[ -WORDSIZE ]);
   nbytes = oldblk->size;
   flp = address_of(_root);
   relative = *flp;
   while ( relative != NIL ) {
      relative_block = relative->block;
      relative_size = relative->size;
      if ( oldblk < relative_block ) {
         data_block nblk;
         nblk = nextblk( oldblk, nbytes );
         if ( nblk == relative_block ) {
            nbytes += relative_size;
            delete( flp );
         }
         else if ( nblk > relative_block ) {
            /* error blocks overlap */
            return( -1 );
         }
         else {
            flp = address_of(relative->left);
         }
```

APPENDIX "C" continued

```
    }
    else if ( oldblk > relative_block ) {
       data_block nblk;
       nblk = nextblk( relative_block, relative_size );
       if ( nblk == oldblk ) {
          oldblk = relative_block;
          nbytes += relative_size;
          delete( fp );
       }
       else if ( nblk > oldblk ) {
          /* error block has been already freed */
          return( -1 );
       }
       else {
          fp = address_of(relative->right);
       }
    }
    else {
       /* error block has been already freed */
       return( -1 );
    }
    relative = *fp;
  }
  insert( oldblk, nbytes );
  return( 0 );
}
```

APPENDIX "D"

```
insert( newblk, len )
data_block newblk;
unsigned integer len;
{
free_header *flp,fblk,*left_ascent,*right_ascent,new_free_hdr;

flp = address_of(_root);
    fblk = *flp;
    while ( len <= length( fblk ) ) {
       if ( newblk < fblk->block )
          flp = address_of(fblk->left);
       else
          flp = address_of(fblk->right);
       fblk = *flp;
    }

*flp = new_free_hdr = getfreehdr( );
    new_free_hdr->left = new_free_hdr->right = NIL;
    new_free_hdr->block = newblk;
    new_free_hdr->size = len;
    newblk->size = len;
    left_ascent = address_of(new_free_hdr->left);
    right_ascent = address_of(new_free_hdr->right);

while ( fblk != NIL ) {
       if ( fblk->block < newblk ) {
          *left_ascent = fblk;
          left_ascent = address_of(fblk->right);
          fblk = fblk->right;
       }
```

APPENDIX "D" continued

```
    else {
        *right_ascent = fblk;
        right_ascent = address_of(fblk->left);
        fblk = fblk->left;
    }
}

*left_ascent = *right_ascent = NIL;
return;
}
```

APPENDIX "E"

```
int delete( p )
free_bdr *p;
{
free_bdr db, left_branch, right_branch;
unsigned integer left_length, right_length;

db = *p;
  left_branch = db->left;
  left_length = length( left_branch );
  right_branch = db->right;
  right_length = length( right_branch );

while ( left_branch != right_branch ) {
     if ( left_length >= right_length ) {
        if ( left_branch != NIL ) {
           if ( left_length == 0 ) {
              /* error zero length block */
              return( -1 )
              break;
```

APPENDIX "E" continued

```
            }
            *p = left_branch;
            p = address_of(left_branch->right);
            left_branch = *p;
            left_length = length( left_branch );
        }
    }
    else {
        if ( right_branch != NIL ) {
            if ( right_length == 0 ) {
                /* error zero length block */
                return( -1 )
                break;
            }
            *p = right_branch;
            p = address_of(right_branch->left);
            right_branch = *p;
            right_length = length( right_branch );
        }
    }
}

*p = NIL;
putfreehdr( db );
return( 0 );
}
```

APPENDIX "F"

```
demote( p )
free_hdr *p;
{
free_hdr db, left_branch, right_branch;
unsigned integer left_length, right_length, db_length;

db = *p;
    db_length = length( db );
    left_branch = db->left;
    right_branch = db->right;
    left_length = length( left_branch );
    right_wlength = length( right_branch );

while ( left_length > db_length || right_length > db_length ) {
        if ( left_length >= right_length ) {
            *p = left_branch;
            p = address_of(left_branch->right);
            left_branch = *p;
            left_length = length( left_branch );
        }
        else {
            *p = right_branch;
            p = address_of(right_branch->right);
            right_branch = *p;
            right_length = length( right_branch );
        }
    }
    *p = db;
    db->left = left_branch;
    db->right = right_branch;
    return;
}
```

APPENDIX "G"

```
reclaim( oldblk, oldsize )
data_block oldblk;
unsigned integer oldsize;
{
data_block oldrelative, freeblk;
free_hdr *flp, p;
unsigned integer size;

oldrelative = nextblk( oldblk, oldsize );
   flp = address_of(_root);
   p = *flp;

while ( (size = length( p )) >= oldsize ) {
      freeblk = p->block;
      if ( oldblk == freeblk ) {
         delete( flp );
         return( 1 );
      }
      else if ( oldblk < freeblk ) {
         flp = address_of(p->left);
         p = *flp;
      }
      else {
         data_block freerelative;
```

APPENDIX "G" continued

```
      freerelative = nextblk( freeblk, freeblk->size );
      if ( oldblk >= freerelative ) {
         fip = address_of(p->right);
         p = *fip;
      }
      else {
         if ( oldrelative > freerelative ) {
            return( -1 );
         }
         else if ( oldrelative == freerelative ) {
            delete( fip );
            freeblk->size -= oldsize;
            free( address_of(freeblk->data) );
            return( 1 );
         }
         else {
            delete( fip );
            freeblk->size -= (freerelative - oldblk);
            oldrelative->size = (freerelative - oldrelative);
            free( address_of(freeblk->data) );
            free( address_of(oldrelative->data) );
            return( 1 );
         }
      }
   }
}
return( 0 );
}
```

What is claimed is:

1. In a computer system comprising a memory having a plurality of memory words, a memory addressing mode independent method for allocating and deallocating portions of said memory, said method comprising the steps of:

a) building a free memory block header binary tree consisting a plurality of free memory block headers corresponding to free memory blocks of a pool of memory words, each of said free memory block headers comprising a starting address and a block size of the corresponding free memory block, said free memory block headers being logically organized into node and leaf free memory block headers of the free memory block header binary tree in accordance with the free memory block headers' starting addresses and block sizes, wherein if a free memory block header is a predecessor free memory block header to a descendant free memory block header, the block size of the predecessor free memory block header greater than the block size of the descendant free memory block header, the starting address of the predecessor free memory block header is higher than the starting address of the descendant free memory block header if the descendant free memory block header is a left branch descendant free memory block header, and the starting address of the predecessor free memory block header is lower than the starting address of the descendant free memory block header if the descendant free memory block header is a right branch descendant free memory block header;

b) allocating free memory blocks of said pool of memory words for memory requests using said free memory block header binary tree; and c) deallocating said allocated memory blocks of said pool of memory words using said memory block header binary tree when said allocated memory blocks are no longer needed by said allocated memory blocks' allocated requestors.

2. The method as set forth in claim 1, wherein, said memory is divided into a plurality of virtually addressed pages.

3. The method as set forth in claim 1, wherein, said memory is divided into a plurality of statically addressed memory segments.

4. The method as set forth in claim 1, wherein, said memory allocation requests comprise:

allocation requests for new blocks of memory;

reallocation requests for portions of previously allocated memory blocks; and reallocation requests for expanded blocks of memory comprising previously allocated memory blocks.

5. The method as set forth in claim 1, wherein, said step c) comprises the steps of:

c.1) locating free memory blocks that are adjacent to the allocated memory blocks being deallocated using said free memory block headers of said free memory block header binary tree;

c.2) deallocating all or portions of the allocated memory blocks; and c.3) if adjacent free memory blocks are located, updating the located adjacent free memory blocks' corresponding free memory block headers in said free memory block header binary tree to reflect the deallocations made, and if said updates cause said inter-generational address and size relationships between the free memory block headers to be violated, reorganizing the free memory block headers in accordance to the starting addresses and block sizes of the free memory block headers to comply with said inter-generational address and size relationship criteria, and if adjacent free memory blocks are not located, inserting new free memory block headers in said free memory block header binary tree to reflect the deallocations made, complying with said inter-generational address and size relationship criteria.

6. The method as set forth in claim 1, wherein, said pool of memory words has a pool size in multiples of said addressable unit; and said step b) further comprises the step of rounding each memory allocation request for memory from said pool of memory words to multiples of said memory words before allocating free memory blocks of said pool of memory words to satisfy the allocation request.

7. The method as set forth in claim 1, wherein, said step b) comprises the steps of:

b.1) selecting free memory blocks to be used to satisfy said memory requests, using said free memory block headers of said free memory block header binary tree;

b.2) allocating all or portions of the selected free memory blocks to satisfy said memory requests; and b.3) updating the selected free memory blocks' corresponding free memory block headers in said free memory block header binary tree to reflect the allocations made, and if said updates cause said required starting address and block size relationships between predecessor and descendant free memory block headers to be violated, reorganizing the free memory block headers in accordance to the starting addresses and block sizes of the free memory block headers to comply with said required starting address and block size relationships between predecessor and descendant free memory block headers.

8. The method as set forth in claim 6, wherein, said step b) further comprises the step of (b.4) writing a block length of an allocated memory block into at least one lower word of the allocated memory block.

9. In a computer system comprising a central processing unit (CPU) coupled to a memory, wherein said memory is divided into a plurality of addressable units, each of said addressable units comprising a fixed number of addressable memory words, a memory addressing independent apparatus for allocating and deallocating portions of said memory, said apparatus comprising:

a) storage means coupled to said CPU for storing a free memory block header binary tree consisting a plurality of free memory block headers corresponding to free memory blocks of a pool of memory words, each of said free memory block headers comprising a starting address and a block size of the corresponding free memory block, said free memory block headers being logically organized into node and leaf free memory block headers of the free memory block header binary tree in accordance to the free memory block headers starting addresses and block sizes, wherein if a free memory block header is a predecessor free memory block header to a descendant free memory block header, the block size of the predecessor free memory block header is greater than the block size of the descendant free memory block header, the starting address of the predecessor free memory block header is higher than the starting address of the descendant free memory block header if the descendant free memory block header is a left descendant free memory block header, and the starting address of the predecessor free memory block header is lower than the starting address of the descendant free memory block header if the descendant free memory block header is a right descendant free memory block header;

b) allocating means comprising said CPU for allocating memory blocks from said free memory blocks of said pool of memory words for memory requests using said free memory block header binary tree; and c) deallocation means comprising said CPU for deallocating said allocated memory blocks of said pool of memory words using said free memory block header binary tree when said allocated memory blocks are no longer needed by said allocated memory blocks allocated requestors.

10. The apparatus as set forth in claim 9, wherein, said memory is divided into a plurality of virtually addressed memory pages.

11. The apparatus as set forth in claim 9, wherein, said memory is divided into a plurality of statically addressed memory segments.

12. The apparatus as set forth in claim 9, wherein, said memory allocation requests comprise:

allocation requests for new blocks of memory;

reallocation requests for portions of previously allocated memory blocks; and reallocation requests for expanded blocks of memory comprising previously allocated memory blocks.

13. The apparatus as set forth in claim 9, wherein, said deallocation means deallocates said allocated memory blocks of said pool of memory words using said free memory block header binary tree by locating free memory blocks that are adjacent to the allocated memory blocks being deallocated using said free memory block headers of said free memory block header binary tree;

deallocating all or portions of the allocated memory blocks; and if adjacent free memory blocks are located, updating the located adjacent free memory blocks' corresponding free memory block headers in said free memory block header binary tree to reflect the deallocations made, and if said updates cause said required starting address and block size relationships between predecessor and descendant free memory block headers to be violated, reorganizing the free memory block headers in accordance to the starting addresses and block sizes of the free memory block headers to comply with said required starting address and block size relationships between predecessor and descendant free memory block headers; and if adjacent free memory blocks are not located, inserting new free memory block headers in said free memory header binary tree to reflect the deallocations made.

14. The apparatus as set forth in claim 9, wherein, said pool of memory words has a pool size in multiples of said addressable unit; and said allocating means further comprises rounding means for rounding each memory allocation request for memory from said pool of memory words to multiples of said addressable memory words before allocating free memory blocks of said pool of memory words to satisfy the allocation request.

15. The apparatus as set forth in claim 9, wherein, said allocation means allocates free memory blocks of said pool of memory words for said memory requests using said free memory block header binary tree by selecting free memory blocks to be used to satisfy said memory requests, using said free memory block headers of said free memory block header binary tree;

allocating all or portions of the selected free memory blocks to satisfy said memory requests; and updating the selected free memory blocks' corresponding free memory block headers in said free memory block header binary tree to reflect the allocations made, and if said updates cause said inter-generational address and size relationships between the free memory block headers to be violated, reorganizing the free memory block headers in accordance to the starting addresses and block sizes of the free memory block headers to comply with said inter-generational address and size relationship criteria.

16. The apparatus as set forth in claim 15, wherein, said allocation means further comprises writing means for writing a block length of an allocated memory block into at least one lower word of the allocated memory block.

17. In a computer system comprising a memory having a plurality of memory words, a memory addressing mode independent method for allocating and deallocating portions of said memory, said method comprising the steps of:

a) building a free memory block header binary tree consisting a plurality of free memory block headers corresponding to free memory blocks of a pool of memory words, each of said free memory block headers including a starting address and a block size of the corresponding free memory block, said free memory block headers being logically organized into node and leaf free memory block headers of the free memory block header binary tree in accordance with the free memory block headers' starting addresses and block sizes, wherein if a free memory block header is a predecessor free memory block header to a descendant free memory block header, the block size of the predecessor free memory block header is greater than the block size of the descendant free memory block header, the starting address of the predecessor free memory block header is higher than the starting address of the descendant free memory block header if the descendant free memory block header is a right branch descendant free memory block header, and the starting address of the predecessor free memory block header is lower than the starting address of the descendant free memory block header if the descendant free memory block header is a left branch descendant free memory block header;

b) allocating free memory blocks of said pool of memory words for memory requests using said free memory block header binary tree; and c) deallocating said allocated memory blocks of said pool of memory words using said memory block header binary tree when said allocated memory blocks are no longer needed by said allocated memory blocks allocated requestors.

18. In a computer system comprising a central processing unit (CPU) coupled to a memory having a plurality of memory words, a memory addressing mode independent apparatus for allocating and deallocating portions of said memory, said apparatus comprising:

a) storage means for storing a free memory block header binary tree consisting a plurality of free memory block headers corresponding to free memory blocks of a pool of memory words, each of said free memory block headers including a starting address and a block size of the corresponding free memory block, said free memory block headers being logically organized into node and leaf free memory block headers of the free memory block header binary tree in accordance to the free memory block headers' starting addresses and block sizes, wherein if a free memory block header is a predecessor free memory block header to a descendant free memory block header, the block size of the predecessor free memory block header is greater than the block size of the descendant free memory block header, the starting address of the predecessor free memory block header is higher than the starting address of the descendant free memory block header if the descendant free memory block header is a right branch descendant free memory block header, and the starting address of the predecessor free memory block header is lower than the starting address of the descendant free memory block header if the descendant free memory block header is a left branch descendant free memory block header;

b) allocating means comprising said CPU for allocating memory blocks from said free memory blocks of said pool of memory words for memory requests using said free memory block header binary tree; and c) deallocation means comprising said CPU for deallocating said allocated memory blocks of said pool of memory words using said free memory block header binary tree when said allocated memory blocks are no longer needed by said allocated memory blocks' allocated requestors.

\* \* \* \* \*